(12) United States Patent
Yeh

(10) Patent No.: US 8,798,267 B2
(45) Date of Patent: *Aug. 5, 2014

(54) VIRTUALIZATION OF CRYPTOGRAPHIC KEYS

(71) Applicant: International Business Machines Corporation, Armonk, NY (US)

(72) Inventor: Phil C. Yeh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,217

(22) Filed: Oct. 19, 2012

(65) Prior Publication Data

US 2013/0058478 A1 Mar. 7, 2013

Related U.S. Application Data

(63) Continuation of application No. 12/551,293, filed on Aug. 31, 2009, now Pat. No. 8,295,481.

(51) Int. Cl.
*G06F 21/00* (2013.01)

(52) U.S. Cl.
USPC .................................. 380/45; 380/284; 718/1

(58) Field of Classification Search
USPC .................. 380/44, 45, 284; 718/1
See application file for complete search history.

(56) References Cited

U.S. PATENT DOCUMENTS

| 4,253,145 | A |   | 2/1981 | Goldberg |         |
|-----------|---|---|--------|----------|---------|
| 4,811,393 | A |   | 3/1989 | Hazard   |         |
| 5,404,563 | A | * | 4/1995 | Green et al. | 718/102 |
| 2003/0210791 | A1 |   | 11/2003 | Binder |  |
| 2006/0256106 | A1 |   | 11/2006 | Scarlata et al. |  |
| 2006/0288232 | A1 |   | 12/2006 | Ho et al. |  |
| 2007/0280483 | A1 |   | 12/2007 | Fu et al. |  |
| 2008/0065886 | A1 |   | 3/2008 | McGough |  |
| 2008/0080708 | A1 |   | 4/2008 | McAlister et al. |  |
| 2008/0313475 | A1 | * | 12/2008 | Malcolm | 713/194 |
| 2009/0034741 | A1 |   | 2/2009 | Sabev |  |
| 2009/0110191 | A1 |   | 4/2009 | Sanvido et al. |  |
| 2011/0051930 | A1 |   | 3/2011 | Yeh |  |

FOREIGN PATENT DOCUMENTS

| JP | 2008500651 A | 1/2008 |
| WO | 2006023334 A2 | 3/2006 |
| WO | 2008042175 A3 | 4/2008 |
| WO | 2009013673 A2 | 1/2009 |
| WO | WO2009044461 A1 | 4/2009 |

OTHER PUBLICATIONS

Edwards, Nigel; "Object Wrapping (for WWW)—The Key to Integrated Services? (Extended Abstract)", Architecture Projects Management Limited, Apr. 25, 1995, pp. 1-6.

(Continued)

*Primary Examiner* — Jung Kim
*Assistant Examiner* — Ayoub Alata
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

A cryptographic key is virtualized to provide a virtual cryptographic key. To virtualize the key, an operation, such as an exclusive OR operation, is used with the key and a mask. The virtual key is usable by a guest of a virtual environment in cryptographic operations.

20 Claims, 4 Drawing Sheets

(56) References Cited

OTHER PUBLICATIONS

U.S. Appl. No. 12/550,667, entitled "Conversion of Cryptographic Key Protection," filed Aug. 31, 2009.

"z/Architecture—Principles of Operation," SA22-7832-07, Feb. 2009.
International Search Report and Written Opinion for PCT/EP2010/062299 dated Nov. 22, 2010.
Office Action for U.S. Appl. No. 12/551,293 dated Jan. 4, 2012.

* cited by examiner

VIRTUALIZATION OF CRYPTOGRAPHIC KEYS

This application is a continuation of co-pending U.S. Ser. No. 12/551,293, entitled "VIRTUALIZATION OF CRYPTOGRAPHIC KEYS," filed Aug. 31, 2009, which is hereby incorporated herein by reference in its entirety.

BACKGROUND

This invention relates, in general, to processing within a virtual computing environment, and in particular, to providing security within that environment.

One aspect of providing security within the virtual environment is to protect cryptographic keys used in cryptographic operations performed by a crypto device. In one example, these keys are protected via encryption. For instance, a cryptographic key is encrypted under a master key providing an encrypted cryptographic key. The master key is kept inside the security boundary of the crypto device. The encrypted cryptographic key can be stored outside the security boundary of the crypto device and is then used in cryptographic operations.

A single processor system has one set of master keys associated therewith. That is, the single processor system has a master key for each type of cryptographic keys. However, in a partitioned environment, there is one set of master keys for each zone or partition.

BRIEF SUMMARY

Although each partition in a partitioned system has its own set of master keys, those keys are traditionally shared by all virtual systems within that partition. As used herein, each virtual system is a computing system running in a virtual environment. It includes, for instance, the resources (e.g., one or more CPUs, memory, I/O, etc.) under control of a guest operating system, such as Linux. Thus, the term "guest" refers to a virtual system. In an effort to enhance security, it is desired that each guest has its own set of virtual master keys. Thus, a need exists for a capability to provide separate virtual keys for each guest executing within a partition.

Additionally, a need exists for a capability to virtualize keys other than master keys, such as other cryptographic keys or other keys.

The shortcomings of the prior art are overcome and additional advantages are provided through the provision of a computer program product for virtualizing cryptographic keys in a virtual computing environment having a hierarchy including a host and one or more layers of guests, wherein a layer corresponds to a virtualization level. The computer program product comprises a non-transitory storage medium readable by a processing circuit and storing instructions for execution by the processing circuit for performing a method. The method includes, for instance, obtaining, by a processor, a cryptographic key; and generating a virtual cryptographic key using an operation, the cryptographic key and a mask, wherein the mask used is dependent on the virtualization level of a guest for which the virtual cryptographic key is being generated.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided to virtualize cryptographic keys. In one particular example, master keys used to protect other cryptographic keys are virtualized, such that each guest of a partition of a computing environment may have its own set of master keys. The set of master keys includes a key for each type of cryptographic key (e.g., AES or DEA) to be protected, and thus, the set may include one or more master keys.

Figure 1:
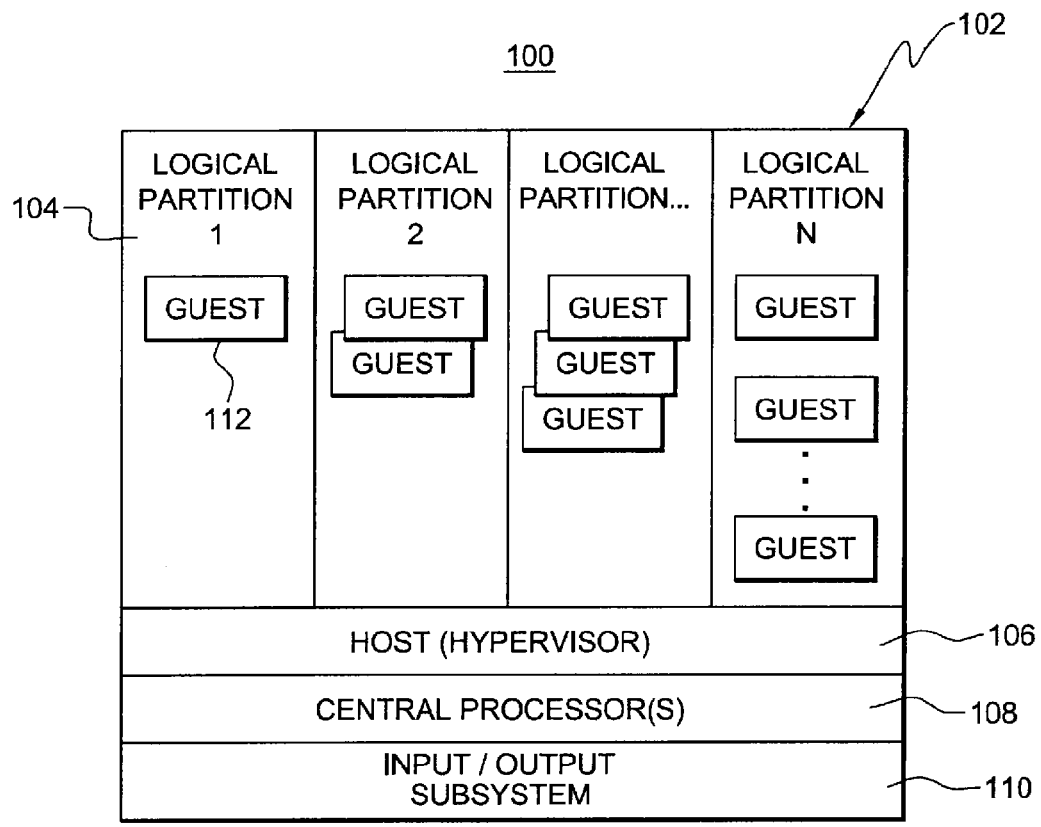
FIG. 1 depicts one example of a computing environment to incorporate and use one or more aspects of the present invention.

One embodiment of a computing environment to incorporate and use one or more aspects of the present invention is described with reference to FIG. 1. Computing environment 100 includes, for instance, a central processor complex (CPC) 102 partitioned into one or more partitions or zones 104 (e.g., logical partitions 1-N), at least one host 106 (e.g., a control program, such as a hypervisor), one or more central processors 108, and an input/output subsystem 110.

Each logical partition 104 is capable of functioning as a separate system. That is, each logical partition can be independently reset, initially loaded with an operating system, if desired, and operate with different programs. An operating system or application program running in a logical partition appears to have access to a full and complete system, but in reality, only a portion of it is available.

Central processors 108 are physical processor resources that are assignable to the logical partitions. For instance, each logical partition 104 includes one or more logical processors, each of which represents all or a share of a physical processor resource that may be dynamically allocated to the partition. In particular, the physical resources are owned by host 106, and the shared physical resources are dispatched by the host to one or more guests 112 running in the partitions managed by host 106. As examples, the host may be implemented in microcode running on processors 108 or be part of a host operating system executing on the machine.

Within each logical partition, one or more guests (even hundreds of thousands) may be running, and each guest can be run at a particular virtualization level. For instance, if a guest is running on the host (e.g., LPAR) and not another guest, it is said to be running at a first level of virtualization. However, if a guest operating system (e.g., Linux) is running on one other guest operating system (e.g., z/VM® offered by International Business Machines Corporation. z/VM® is a registered trademark of International Business Machines Corporation, Armonk, N.Y. Other names used herein may be registered trademarks, trademarks or product names of International Business Machines Corporation or other companies.) (see, e.g., logical partition 2 of FIG. 1), then it is running at a second level of virtualization. Guests can be layered and the number of layers determines the level of virtualization (see, e.g., logical partition . . . of FIG. 1).

To provide security within the computing environment, cryptographic keys used in cryptographic operations are encrypted using a master key. Each logical partition of the computing environment has its own set of master keys (i.e., a master key for each type of cryptographic key to be protected). In one example, each master key is randomly generated using a pseudo random generator and is stored in a secure portion of a hardware system area (HSA). In accordance with an aspect of the present invention, each guest of the logical partition is provided its own virtual master key. This is accomplished by taking the master key for that logical partition and virtualizing it for each of the guests, as described in detail herein.

Figure 2:
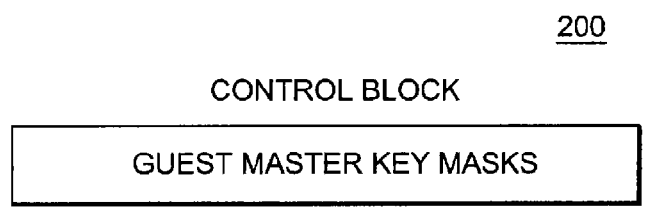
FIG. 2 depicts one example of a control block of a guest to include one or more guest master key masks used in accordance with an aspect of the present invention.

In one embodiment, to virtualize a cryptographic key, such as a master key, a mask is used. Each guest has its own mask, and as depicted in FIG. 2, this mask is stored within a control block 200. The control block may include one or more masks for the guest. In the embodiment described herein, the key being virtualized is a master key, and therefore, there is a mask for each type of master key available to the guest. If there is only one type of master key, then there may only be one master key mask. In one example, the mask is a unique number, such as a sequential number starting from an initial point and incrementing by one each time a number is used. In a further example, the number need not be unique, but can, for instance, be a strong random number in which there is a very small chance of duplication. Other possibilities also exist.

The mask of a guest is assigned, for instance, by the operating system the guest is running under. For example, the mask of a guest at a second level of virtualization is assigned by the guest, such as the z/VM® operating system, at a first level of virtualization. The mask of a guest is placed in the control block for the guest by the operating system that created that mask. The mask is inaccessible to the guest and remains the same during the lifespan of the guest (i.e. until the guest is IPLed).

In one example, to provide a virtual master key, a boolean operation, such as an exclusive OR (or other operation), is performed using the master key and one or more masks. The number of masks used to create the virtual master key depends on the level of virtualization for the guest. For instance, if the guest is at a first level of virtualization, one mask is used; at a second level of virtualization, two masks (aside from possible intermediate masks resulting from the boolean operation) are used, etc. This processing is described in further detail with reference to FIG. 3.

Figure 3:
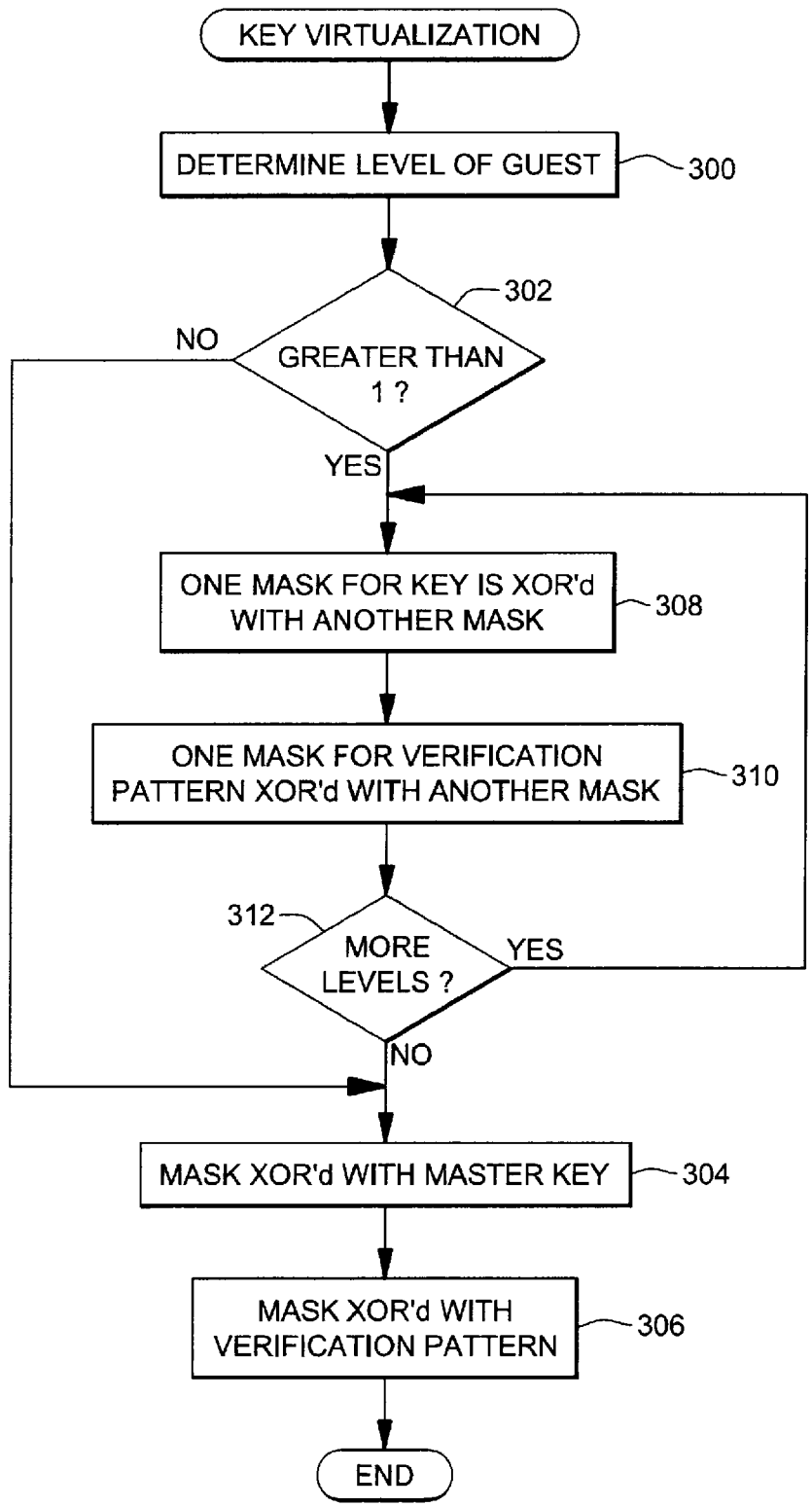
FIG. 3 depicts one embodiment of logic to provide virtual keys, in accordance with an aspect of the present invention.

With reference to FIG. 3 one embodiment of the logic used to provide virtual cryptographic keys, such as virtual master keys, is described in detail. In one example, this logic is performed by a processor of the computing environment, and in particular, the millicode executing therein. Further, this example relates to virtualizing master keys; however, in other embodiments keys other than master keys, such as other cryptographic keys, may be virtualized using the same process. The master key is generated by millicode, in one example.

Initially, to create a virtual master key, a determination is made as to the level of the guest for which the key is being created, STEP 300. This information is known to the millicode running on a central processor. If the virtualization level of the guest is one, INQUIRY 302, then the mask associated with that guest is exclusive OR'd with the appropriate master key to provide a virtual master key for the guest, STEP 304. In particular, the mask stored in the control block (or elsewhere) for this guest is retrieved and an XOR operation is performed with the mask and the master key assigned to the partition in which the guest is executing. The result of this XOR is the virtual master key, which may be used to encrypt/decrypt a cryptographic key.

Further, in accordance with an aspect of the present invention, a virtual verification pattern is also generated which is used during processing to determine whether the virtual master key is still valid. That is, associated with each master key is a verification pattern that is generated by a pseudo random number generator. The verification pattern is used to detect a change in the master key. If a new master key is generated, so is a new verification pattern.

In one example, to create a virtual verification pattern, the same mask used to create the virtual master key is exclusive OR'd with a verification pattern provided for the master key, STEP 306. The result of this operation provides a virtual verification pattern for the guest. Although in this example, the mask used for the verification pattern is the same as the mask used for the virtual master key, in another embodiment, the masks can be different.

Returning to INQUIRY 302, if the level of guest for which a virtual master key is to be created is greater than one, then one or more exclusive OR operations are performed using a number of masks dependent on the level of the guest. For example, the mask associated with that guest is retrieved and exclusive OR'd with a mask of the guest at the next lowest level to provide a resulting mask, STEP 308. For instance, if the guest for which the virtual master key is to be created is a second level guest, then the mask for that guest is XOR'd with the mask of the guest at the first level to provide a resulting mask.

Similarly, a mask assigned to the guest for verification patterns is exclusive OR'd with a verification pattern mask assigned to the guest at the next lowest level to provide a resulting mask used to create a virtual verification pattern, STEP 310. This step may be skipped if the masks in STEPs 308 and 310 are the same.

If there are no more levels of virtualization for the guest for which the virtual key is being created, INQUIRY 312, then the resulting mask obtained to create the virtual master key is XOR'd with the master key of the partition in which that guest is executing to provide the virtual master key for that guest, STEP 304. Similarly, the resulting mask obtained to create the virtual verification pattern is XOR'd with the verification pattern of the partition to provide the virtual verification pattern, STEP 306.

Returning to INQUIRY 312, if however, there are more levels of virtualization, then the processing is repeated in which the resulting mask from the earlier processed STEP 308 is then exclusive OR'd with the mask at the next lowest level, STEP 308, and if necessary or desired, the resulting mask from the earlier processed STEP 310 is exclusive OR'd with the mask at the next lowest level for the verification pattern, STEP 310. Processing then continues as described above.

In one example, the virtual master key is used to encrypt a cryptographic key to provide an encrypted cryptographic key. To encrypt under the master key, an encipher operation is used. For example, this encryption is accomplished by invoking an existing crypto-assist (a.k.a., message security assist) encryption function which uses a clear data-encrypting key to encrypt the data. The millicode invokes this function by specifying the user clear key as data and the master key as the clear data-encrypting key. The existing function takes these inputs and provides an encrypted key as output. Any encryption function will suffice. In one example, the encryption function supplied with the z/Architecture® offered by International Business Machines Corporation, Armonk, N.Y., is used. An embodiment of this function is described in "z/Architecture® Principles of Operation," IBM Publication No. SA22-7832-07, February 2009, which is hereby incorporated herein by reference in its entirety.

Figure 4:
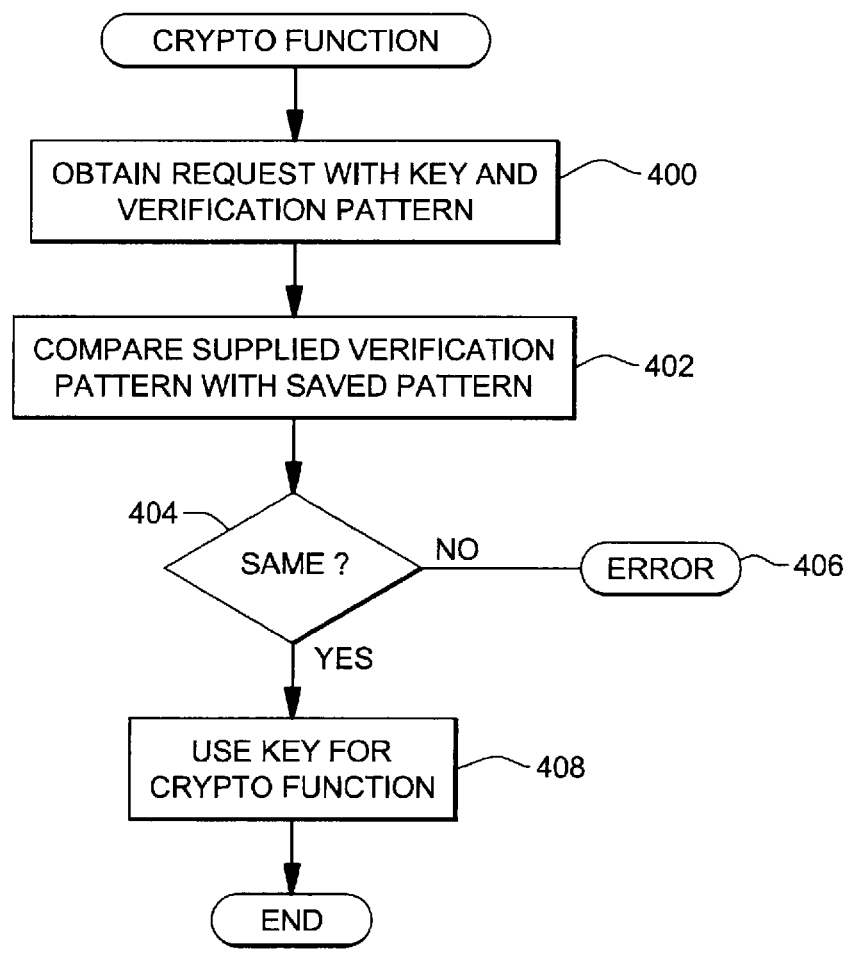
FIG. 4 depicts one embodiment of logic to use an encrypted key encrypted under a virtual key, in accordance with an aspect of the present invention.

The resulting encrypted key and virtual verification pattern can then be used during processing. In one example, the encrypted key and virtual pattern are used during the processing of cryptographic functions. One embodiment of this processing is described with reference to FIG. 4. In one example, a processor (e.g., millicode executing on a CPU) is performing this logic.

Initially, a guest running in a logical partition issues a request for a cryptographic operation and supplies the cryptographic key encrypted with its own virtual master key and the virtual verification pattern, STEP 400. The supplied verification pattern is then compared with a virtual pattern generated for the guest during the crypto operation by the millicode using the same process described above, STEP 402. In one example, in response to generating the pattern, the pattern is saved in a secure portion of storage, such as a secure portion of the hardware system area, and used for comparison. If the comparison provides a mismatch, INQUIRY 404, then an error is provided, STEP 406. If an error is indicated, then this specifies that the virtual master key used to encrypt the cryptographic key has changed and that a new virtual master key is to be used, as described above.

Returning to INQUIRY 404, if the verification patterns match, then the encrypted key for the guest may be used in a cryptographic function, such as decryption or encryption, STEP 408. This concludes processing.

Further details relating to the use of master keys are described in U.S. Ser. No. 12/550,667 entitled "Conversion of Cryptographic Key Protection," filed Aug. 31, 2009, which is hereby incorporated herein by reference in its entirety.

Described in detail above is a capability for virtualizing a master key assigned to a particular partition or zone such that each guest running within that zone may have its own virtual master key. This virtual master key is created when needed. Once created, it is used until re-created (e.g., due to an IPL, etc.).

Although in the embodiment described herein a virtual master key is created, other keys, including other cryptographic keys, can also be virtualized in the same manner.

In the embodiment described above, each virtual system has a mask. A virtual system may consist of several virtual central processors (or called guest central processors). In another embodiment, a mask may be assigned to each guest central processor, and all masks of the guest central processors within the same virtual system have the same value.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
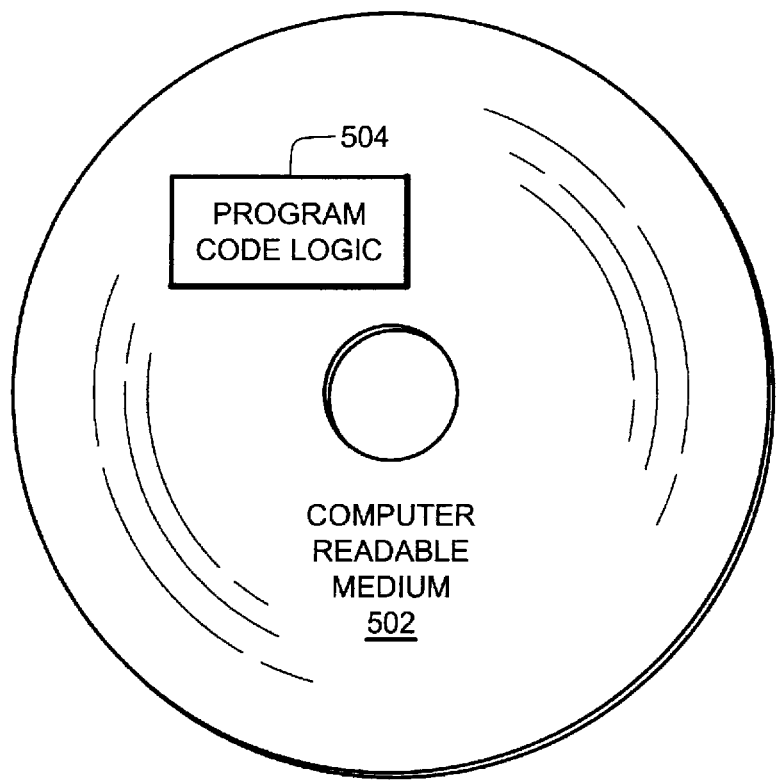
FIG. 5 depicts one embodiment of a computer program product incorporating one or more aspects of the present invention.

Referring now to FIG. 5, in one example, a computer program product 500 includes, for instance, one or more computer readable media 502 to store computer readable program code means or logic 504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments other than those described above can incorporate and use one or more aspects of the present invention. For instance, operating systems other than Linux or z/VM® may be used. Further, although logical partitioning is described herein, one or more aspects of the present invention pertain to other types of partitions or zones. There also may be more or less partitions or zones, and each partition may execute zero or more guests. Many types of guests can be executed, including various operating systems. Additionally, keys other than master keys can be virtualized. Moreover, the virtual verification patterns are optional. Many other variations exist.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for virtualizing cryptographic keys in a virtual computing environment having a hierarchy comprising a host and one or more layers of guests, wherein a layer corresponds to a virtualization level, the computer program product comprising:
    a non-transitory storage medium readable by a processing circuit and storing instructions for execution by the processing circuit for performing a method comprising:
        obtaining, by a processor, a cryptographic key; and
        generating a virtual cryptographic key using an operation, the cryptographic key and a mask, wherein the mask used is determined based at least partially on the virtualization level of a guest for which the virtual cryptographic key is being generated.

2. The computer program product of claim 1, wherein the operation comprises an exclusive OR operation, and wherein the generating comprises performing an exclusive OR operation between the cryptographic key and the mask to provide the virtual cryptographic key.

3. The computer program product of claim 1, wherein based on a first level of virtualization for the guest, the mask comprises a mask generated for that guest.

4. The computer program product of claim 1, wherein based on the virtualization level being greater than 1, the mask is a resulting mask obtained from performing one or more exclusive OR operations on a plurality of masks, wherein the plurality of masks comprises a number of masks, the number being dependent on the virtualization level.

5. The computer program product of claim 1, wherein the virtual cryptographic key is a virtual master key, and the method further comprises creating a virtual verification pattern usable to validate the virtual master key.

6. The computer program product of claim 5, wherein the creating comprises using another operation, a verification pattern and another mask to create the virtual verification pattern.

7. The computer program product of claim 6, wherein the another operation comprises an exclusive OR operation, and the another mask is the same as the mask.

8. The computer program product of claim 6, wherein at least one of the another operation and the another mask is different from the operation and the mask, respectively.

9. The computer program product of claim 6, wherein the method further comprises using the virtual verification pattern to validate the virtual master key, the using comprising:
    obtaining an encrypted key, encrypted with the virtual master key, and the virtual verification pattern as part of a request for a cryptographic operation issued by the guest; and
    comparing the virtual verification pattern obtained as part of the request with another virtual verification pattern generated for the guest, wherein a match of the virtual verification pattern and the another virtual verification pattern indicate the encrypted key may be used in the cryptographic operation.

10. The computer program product of claim 1, wherein the mask is a unique number that is unique for a lifespan of the guest using the virtual cryptographic key.

11. A computer system for virtualizing cryptographic keys in a virtual computing environment having a hierarchy comprising a host and one or more layers of guests, wherein a layer corresponds to a virtualization level, the computer system comprising:
    a memory; and
    a processor in communications with the memory, wherein the computer system is configured to perform a method, said method comprising:
        obtaining a cryptographic key; and
        generating a virtual cryptographic key using an operation, the cryptographic key and a mask, wherein the mask used is determined based at least partially on the virtualization level of a guest for which the virtual cryptographic key is being generated.

12. The computer system of claim 11, wherein the operation comprises an exclusive OR operation, and wherein the generating comprises performing an exclusive OR operation between the cryptographic key and the mask to provide the virtual cryptographic key.

13. The computer system of claim 11, wherein based on a first level of virtualization for the guest, the mask comprises a mask generated for that guest.

14. The computer system of claim 11, wherein based on the virtualization level being greater than 1, the mask is a resulting mask obtained from performing one or more exclusive OR operations on a plurality of masks, wherein the plurality of masks comprises a number of masks, the number being dependent on the virtualization level.

15. The computer system of claim 11, wherein the virtual cryptographic key is a virtual master key, and the method further comprises creating a virtual verification pattern usable to validate the virtual master key, wherein the creating comprises using another operation, a verification pattern and another mask to create the virtual verification pattern.

16. The computer system of claim 15, wherein the method further comprises using the virtual verification pattern to validate the virtual master key, the using comprising:
    obtaining an encrypted key, encrypted with the virtual master key, and the virtual verification pattern as part of a request for a cryptographic operation issued by the guest; and
    comparing the virtual verification pattern obtained as part of the request with another virtual verification pattern generated for the guest, wherein a match of the virtual verification pattern and the another virtual verification pattern indicate the encrypted key may be used in the cryptographic operation.

17. A method of virtualizing cryptographic keys in a virtual computing environment having a hierarchy comprising a host and one or more layers of guests, wherein a layer corresponds to a virtualization level, said method comprising:
- obtaining, by a processor, a cryptographic key; and
- generating, by the processor, a virtual cryptographic key using an operation, the cryptographic key and a mask, wherein the mask used is determined based at least partially on the virtualization level of a guest for which the virtual cryptographic key is being generated.

18. The method of claim 17, wherein the operation comprises an exclusive OR operation, and wherein the generating comprises performing an exclusive OR operation between the cryptographic key and the mask to provide the virtual cryptographic key.

19. The method of claim 17, further comprising creating a virtual verification pattern usable to validate the virtual cryptographic key.

20. The computer program product of claim 1, wherein the virtual cryptographic key comprises a virtual master cryptographic key for encryption of another cryptographic key.

* * * * *